United States Patent
Chepel et al.

(10) Patent No.: US 8,005,797 B1
(45) Date of Patent: Aug. 23, 2011

(54) FILE-LEVEL CONTINUOUS DATA PROTECTION WITH ACCESS TO PREVIOUS VERSIONS

(75) Inventors: Dmitry M. Chepel, Moscow (RU);
Maxim V. Lyadvinsky, Moscow (RU);
Maxim V. Goldobin, Moscow (RU);
Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 0 days.

(21) Appl. No.: 12/581,199

(22) Filed: Oct. 19, 2009

Related U.S. Application Data

(63) Continuation-in-part of application No. 12/263,474, filed on Nov. 2, 2008, which is a continuation-in-part of application No. 12/060,452, filed on Apr. 1, 2008.

(51) Int. Cl.
*G06F 17/00* (2006.01)

(52) U.S. Cl. .................... 707/649; 707/679

(58) Field of Classification Search .......... 707/679, 707/639, 999.204
See application file for complete search history.

(56) References Cited

U.S. PATENT DOCUMENTS

| | | | |
|---|---|---|---|
| 5,604,862 A * | 2/1997 | Midgely et al. | 714/6 |
| 5,608,865 A * | 3/1997 | Midgely et al. | 714/1 |
| 6,684,229 B1 * | 1/2004 | Luong et al. | 1/1 |
| 2003/0177306 A1 * | 9/2003 | Cochran et al. | 711/114 |
| 2005/0027956 A1 * | 2/2005 | Tormasov et al. | 711/162 |
| 2007/0260830 A1 * | 11/2007 | Faibish et al. | 711/162 |
| 2008/0140963 A1 * | 6/2008 | Thomason et al. | 711/162 |

* cited by examiner

*Primary Examiner* — Charles Rones
*Assistant Examiner* — Yuk Ting Choi
(74) *Attorney, Agent, or Firm* — Bardmesser Law Group

(57) ABSTRACT

A system for continuous data protection includes a storage device and a backup storage device. The continuous data protection procedure is performed as two parallel processes: creating an initial backup by copying a data as a file/directory from the storage device into the backup storage device, and copying the data to be written to the data storage as a part of a file/directory into the incremental backup. When a write command is directed to a file system driver, it is intercepted and redirected to the backup storage, and the data to be written in accordance with the write request, is written to the incremental backup on the backup storage. If the write command is also directed to a data (a file/directory) that has been identified for backup, but has not yet been backed up, the identified data (a file/directory) is copied from the storage device to the intermediate storage device. Then, the write command is executed on the identified file/directory on the storage device and the file/directory is copied from the intermediate storage device.

20 Claims, 12 Drawing Sheets

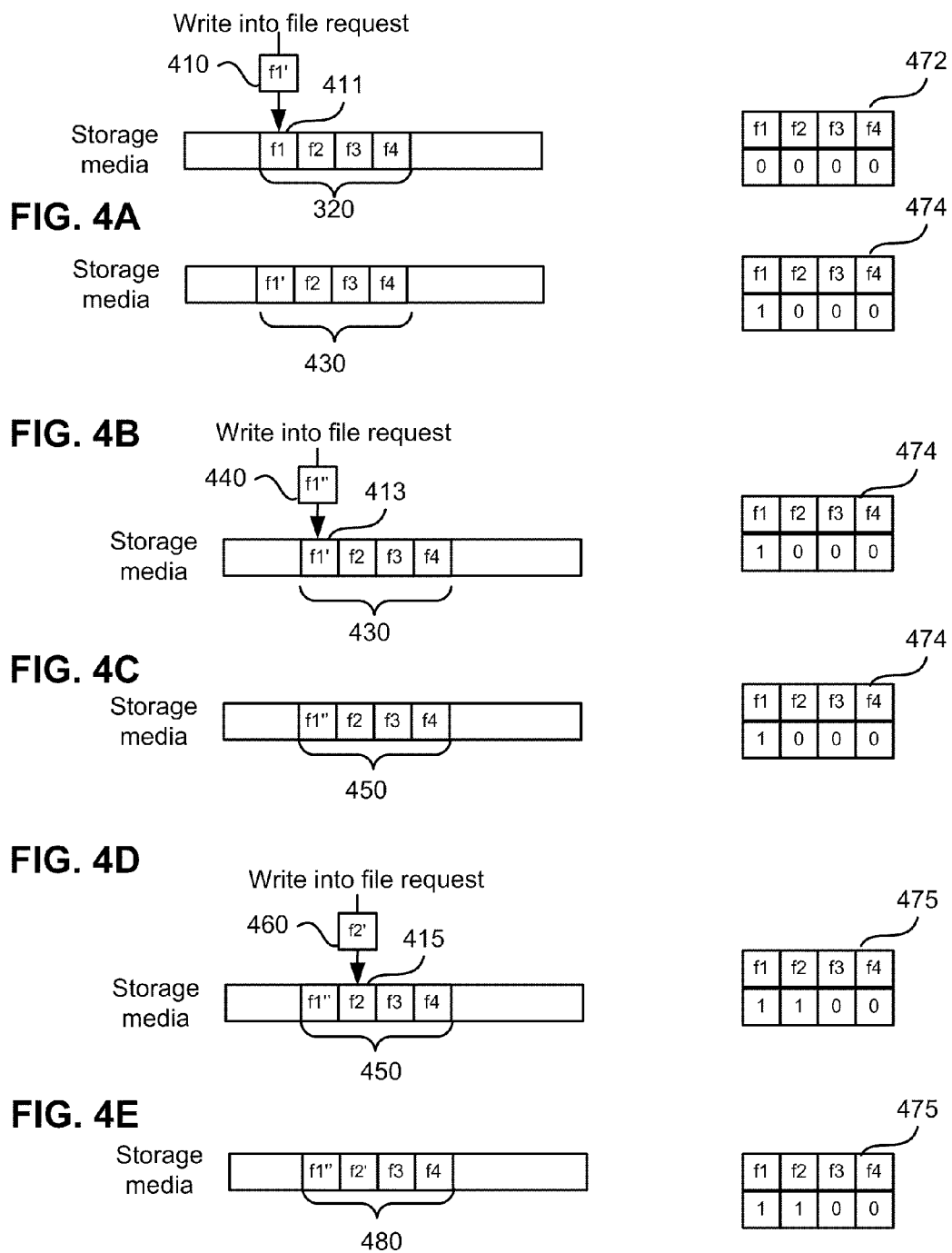

FILE-LEVEL CONTINUOUS DATA PROTECTION WITH ACCESS TO PREVIOUS VERSIONS

CROSS-REFERENCE TO RELATED APPLICATIONS

This application is a continuation in part of U.S. patent application Ser. No. 12/263,474, filed Nov. 2, 2008, which is a continuation in part of U.S. patent application Ser. No. 12/060,452, filed on Apr. 1, 2008, both of which are incorporated by reference herein in their entirety.

BACKGROUND OF THE INVENTION

1. Field of the Invention

The present invention relates to continuous data protection, and more particularly, to continuously archiving data on a storage device within a pre-set time period.

2. Background Art

Currently, there are a number of conventional methods that relate to organization of data archiving. One of these methods is a backup of the entire hard drive, which typically involves copying of the hard drive contents onto some other medium (such as, for example, another hard disk drive, a DVD ROM, a DVD RAM, a flash disk, etc.). The primary disadvantage of such a method is a need to backup what can be a very large amount of data, which, on the one hand, results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically, the contents of the hard disk drive are archived, or stored somewhere once. After that, only the data that has been changed, or added, since the previous backup, or since the pervious incremental backup, is actually archived. Recovery of the data from the archive typically involves merging of the original backup and the various incremental backups.

For conventional backups it is possible to restore data to the point at which the backup was taken. In case of a system failure, the data can be restored from the last incremental backup. In this case, data from the time of this incremental backup creation up to the time of a system failure will be lost.

On the other hand, continuous data protection is different from traditional backups. With continuous data protection, an initial backup can be created as in the case of a traditional backup, but the new data (which is written on the storage device) is backed up in the incremental backup in parallel to writing on the storage device. In other words, the new data is backing up to the incremental backup during the process of the new data being written to the storage device.

In some cases a full back up is not needed. Instead, only the previous versions of files or parts thereof (i.e., data-sets), which are rewritten as a result of write file requests, can be saved (i.e., backed up). However, viewing and accessing a number of previous versions of files can be a difficult and time consuming process.

Accordingly, there is a need in the art for an effective and efficient method of continuous protection of files that provides an easy and convenient way of viewing previous versions of data contained on data storage a while ago. The viewing of the previous versions of data should be done with minimal time and effort, so the data backup process allows a computer system to remain online (so called online backup, instead of a off-line backup, where the system must be stopped to end the backup process), with a possibility to restore data from the backup at the time of the system failure up to any pre-selected points of restoration.

SUMMARY OF THE INVENTION

Accordingly, the present invention provides a system and method for continuous data protection allowing efficient viewing of previous version for data up to the point of restoration that substantially overcomes the disadvantages of the related art.

An exemplary system includes a storage device and a backup storage device for storing files and directories. According to an exemplary embodiment, continuous data protection can provide data restoration from an incremental backup to the point in time before a system failure. Also, a user can select restoration points for data recovery, as in the case of a traditional incremental backup. A method for continuous data protection is based on a file-level monitoring.

In one embodiment, a previous state of data storage at any point in time can be viewed. Also, the previous state of the data storage can be restored onto selected data storage. Alternatively, previous versions of files and directories located on the data storage can be restored.

In the exemplary embodiment, the continuous data protection procedure is performed as two parallel processes: copying a data as a file/directory from the storage device into the backup storage device (i.e., creating an initial backup), and copying the data to be written to the data storage as a part of a file/directory into the incremental backup.

Alternatively, it can be performed as one process: copying the data to be written to the data storage as a part of a file/directory on the storage. When a write command is directed to a file system driver, it is intercepted and redirected to the backup storage, and the data, which is to be written in accordance with the write request, is written to the incremental backup on the backup storage.

If the write command is also directed to a data (i.e., a file/directory) that has been identified for backup, but has not yet been backed up, the identified data (i.e., a file/directory) is copied from the storage device to an intermediate storage device. Then, the write command is executed on the identified file/directory on the storage device, and the file/directory is copied from the intermediate storage device to the backup storage device.

The intermediate storage device can be external to a file system of a computer that includes the storage device, or it can be located on the same storage device, or it can be a separate partition of the storage device, or it can be a file within a file system. The system suspends a write command to the storage device during the initial data backup process, if the intermediate storage device has reached a pre-set data capacity, and copies a selected amount of data from the intermediate storage device to the backup storage device. Thus, up-to-the-minute data is backed up into the backup. In case of a system failure, the last changed data can be restored and will not be lost.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 4A-4E illustrate examples of continuous data backup, in accordance with the exemplary embodiment;

DETAILED DESCRIPTION OF EMBODIMENTS OF THE INVENTION

Reference will now be made in detail to the embodiments of the present invention, examples of which are illustrated in the accompanying drawings.

A computer file system is located on the data storage device and interacts with storage device at a block level. For example, read and write operations are performed in connection with data areas that have sizes that are divisible by the size of an individual block. The sequence of the blocks in the storage is ordered and each block has its own number. The computer system can include several such storage devices and the file system can take only a portion of one such a storage, the whole storage, or several such storages or parts there of. On a disk or a storage device, these types of storages are usually located in partitions, taking the entire partition.

Figure 1:
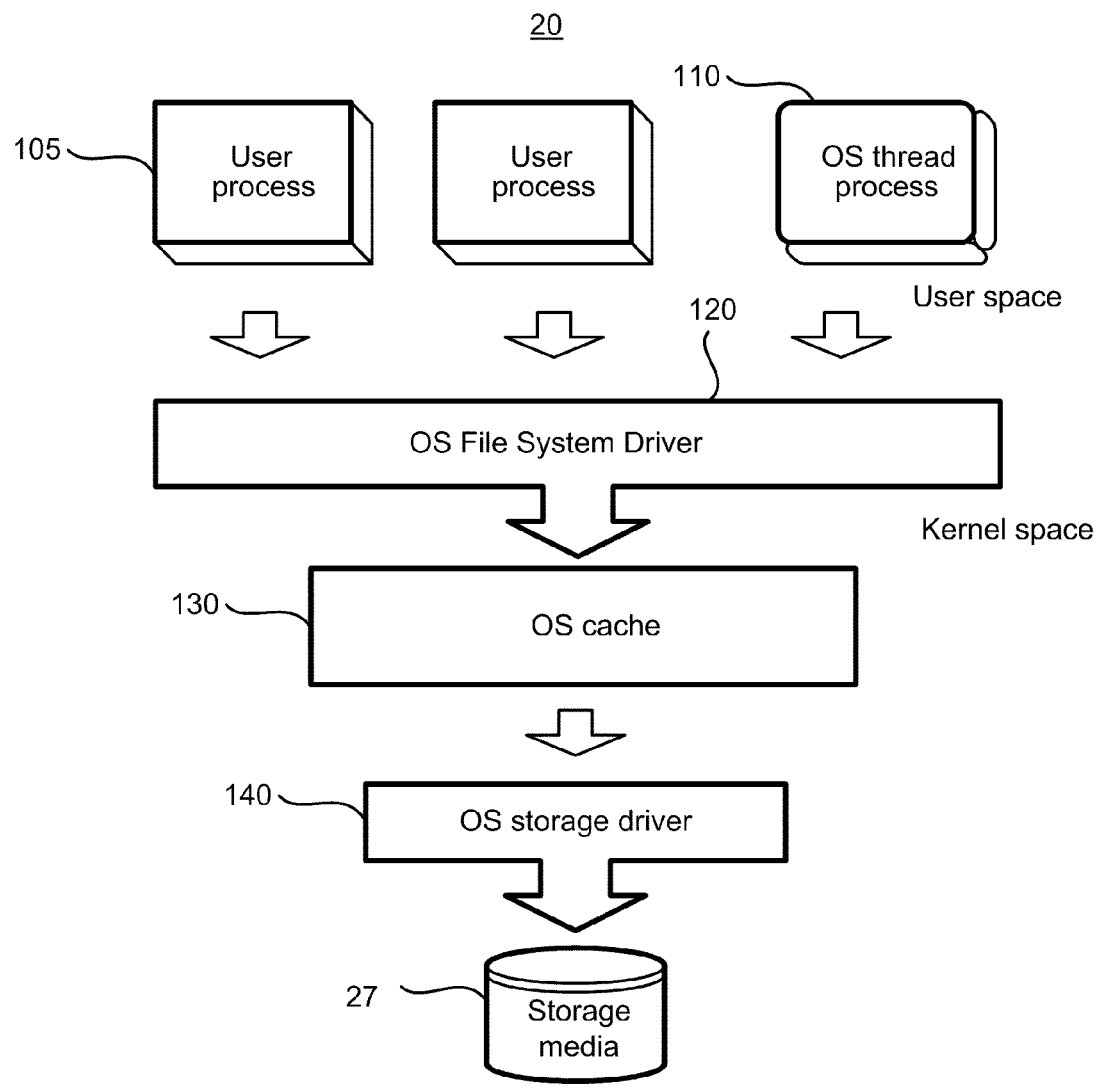
FIG. 1 illustrates processes and drivers in a computer system, in accordance with the exemplary embodiment.

The file systems can be of several categories based on file types: the housekeeping data of the file system volume, file metadata, file data, and free space not occupied by the other data. A file system driver embedded into the operating system can provide servicing for the file system. FIG. 1 illustrates an exemplary processes and architecture of a computer system, 100. The computer system 100 includes a data storage device 27 accessible by one or more user processes 105 or OS thread processes 110. OS user processes 100 or OS thread processes 110 can request to read or write data to and from the storage media 27 via a file system request.

This request can be directed to a file system driver 120, which defines where in the storage media the relevant data blocks are located. The request can then be directed (optionally) to the OS cache 130, where the requested data is currently cached. If the requested data is located in the OS cache 130, the system can complete the requested operation by allowing the user process 100 or OS thread process 110 to perform a read/write operation on the cached data. If the requested data is not located in the OS cache 130 or is otherwise unavailable (e.g., the space in the cache must be freed up pursuant to an OS algorithm), the request is transmitted for execution to the OS storage driver 140. Subsequently, the OS storage driver performs the requested operation on the selected data located in the storage media 27.

The OS storage driver 140 interacts with the storage media 27 in a block mode. In the context of data management, a block is a group of records on a storage media. Blocks are typically manipulated as units. For example, a disk drive can read and write data in 512-byte blocks. Accordingly, the OS storage driver 140 can receive requests for data read and write using blocks of the selected block size.

Each data block is associated with a number or label corresponding to the type of the operation to be performed. Thus, the driver associated with the data write operation acquires a set of numerical pairs (e.g., a data block and a number) in order to process the data write command.

Figure 2A:
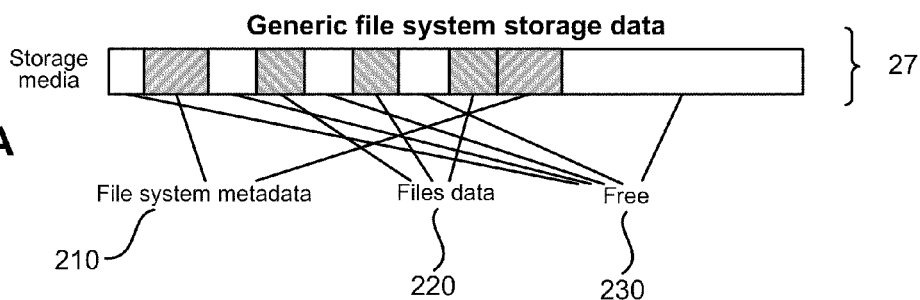
FIGS. 2A-2C illustrate exemplary embodiments of the system storage, including an intermediate data container for data backup, in accordance with the exemplary embodiment.
Figure 2B:
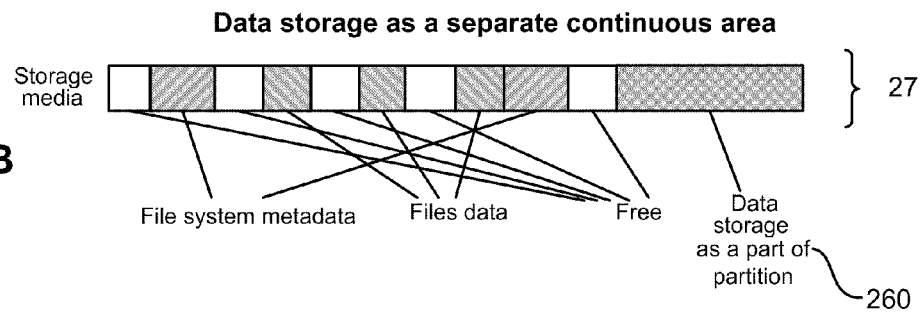
Figure 2C:
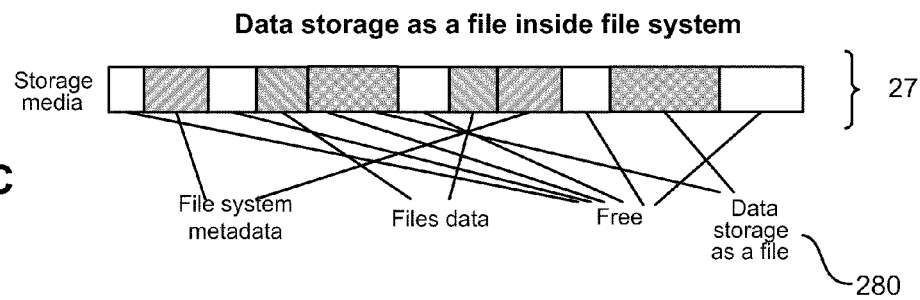

FIG. 2 illustrates an exemplary embodiment of a system storage device. The storage medium 27 is a file system storage data device. From the point of view of the file system, files/directories, as blocks of data in the block data storage medium 27, can be defined by several different classes. Depending on the file system type, the storage medium 27 can store data specific for the volume, metadata of the file system 210, file data 220, or free space 230 not currently taken up by other data. Generally, a specific data type can be allocated to an entire data block and different data types cannot be combined in one block. A file system can combine different data into one block under special circumstances The data storage (i.e., a backup storage) can be placed on the storage media 27 as a part 260 of a storage media partition, or as a file 280 inside a file system on the storage media 27. Also, the data storage can be placed on the other storage media on the same server (for example, personal computer, workstation, storage server etc.), or the data storage can be connected via network (such as, for example, LAN, SAN, NAS etc.). Also, note that the data storage can be placed not only on one storage media (i.e., as a part of a storage media), and not only on one partition (i.e., volume). The data storage can be also placed on the few parts of partitions (i.e., volumes), or it can be placed in several files.

Figure 3:
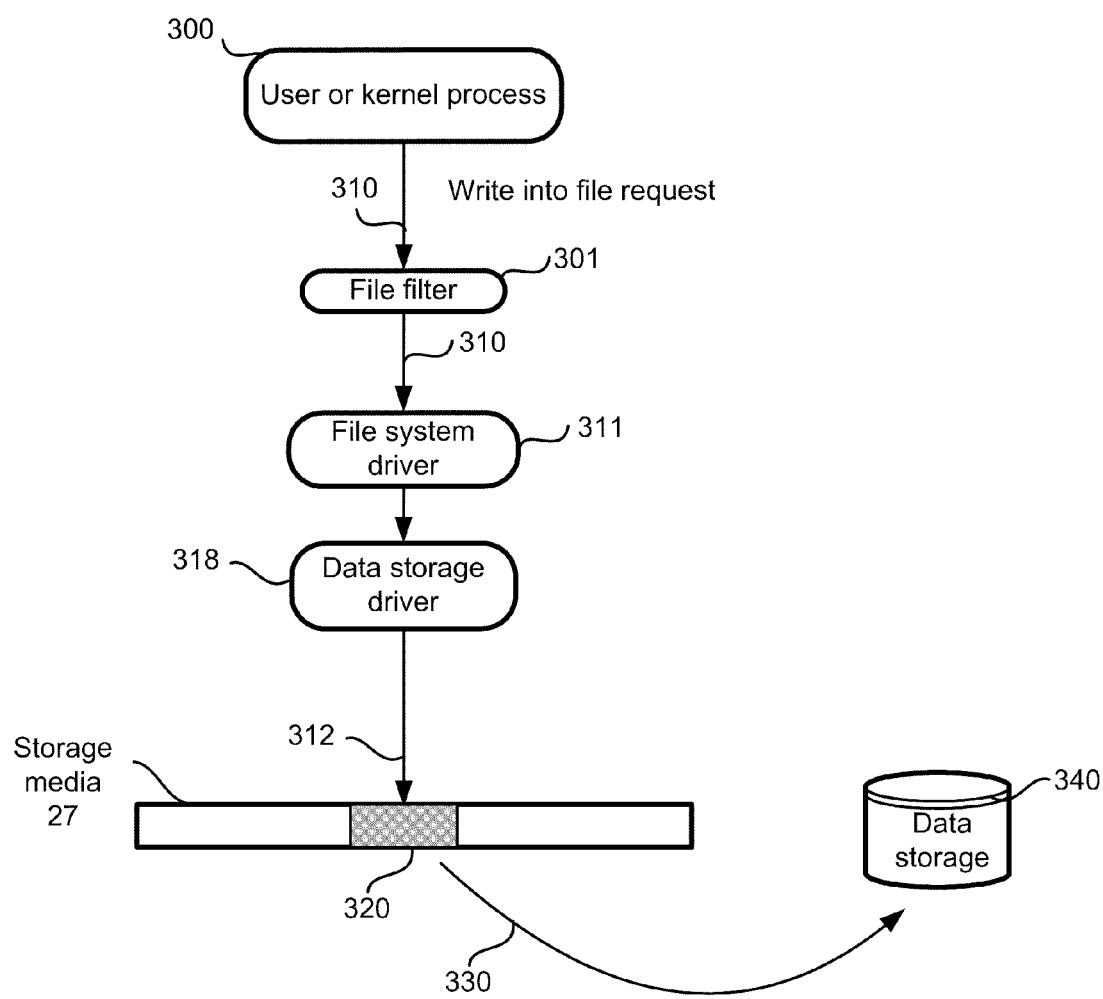
FIG. 3 illustrates a continuous data backup process, in accordance with the exemplary embodiment.

FIG. 3 illustrates an exemplary embodiment of the online backup process that addresses the shortcomings of an off-line data backup. For the purposes of illustration, the following example assumes that the backup process for the data of additional data storage 340 is launched so that the backup process can be performed online.

After a procedure for protecting files and directories is started, a list of protected objects is generated. The list of the protected objects duplicates that part of the file system tree that contains protected objects. For example, the user decides to protect \Folder1\Folder2. Folder1 contains File11 and File12. Folder2 contains File21 and File22. If this is the case, then the following folders inside the tree storage are created, for example: \Storage\Tree\D.Folder1, \Storage\Tree\D.Folder1\D.Folder2, and the following files are stored: Storage\Tree\D.Folder1\D.Folder2\F.File21, Storage\Tree\D.Folder1\D.Folder2\F.File22.

Also note that a list of unprotected objects can be created. The list of the unprotected objects duplicates the part of the file system tree that contains the unprotected objects. Thus, all other objects are protected by default.

The object creation occurs right after the user has decided to protect \Folder1\Folder2. Note that there are no files created inside the tree storage for \Folder1\File11 and \Folder1\File12, because \Folder1 is not chosen to be a protected one. Special prefixes in object names (D. for folder and F.—for file) are used to avoid the problems when a user decides to protect a folder Folder, having sub-folder object, and moves the folder object out, and then, creates a file Object. If such prefixes are not used, file creation is not reflected in the tree storage because the folder Object already exists there.

Each object created inside the list of objects and residing below a protected folder has a property that contains timestamp records. Each timestamp record includes two timestamps—the first one reflects the time when either user enabled protection on that object or the object became protected due to its appearance in a parent folder, which is already protected, and the second time stamp reflects either the time when the object became unprotected due to its renaming, or the time of removal or FFFFFFFFFFFFFFFF (hex) if it is under protection at the moment.

So if a user decides to protect a folder Folder and renames it into AnotherFolder and finally renames it back, then the following records can be placed inside the folder's alternate stream—time1.time2 and time3.FFFFFFFFFFFFFFFF, where time1—a time stamp when the protection was started, time2—a time stamp when Folder was renamed into AnotherFolder, time3—a time stamp when AnotherFolder was renamed into Folder. In addition to the specified timestamps, the records created in the files contain a number of a file record where the data of this file is located (i.e., for the files the records look like time1.time2-RecordNumber).

Note also that the timestamps can be set not just for a particular protected object, but for the entire set of protected objects, during the backup creation (whether full or incremental). The timestamp can be stored in the directory tree, or together with the backup.

Note also that when a protected object is renamed, the old name of the object and the new name can be in the attributes of the protected object, or in the object's metadata (described below), after which a link is established between the old object and the new object, so that the backup system can see that the new object once had an old name. This is useful for avoiding backing up the entire object, but only the changed data sets, since simple file opening and viewing does not change the contents of the file.

According to the exemplary embodiment, a list of protected objects can be stored on the data storage device as a part of a backup or it can be stored separately. The file of a database can also be created and backed up on the data storage. The protected objects, storage media (on which protected objects are located), protected objects' metadata, and other data related to the protected objects (such as, for example, storage media, volumes, objects placement) are stored on the data storage. Also, additional information about the objects selected by the user for protection (such as, timestamps for starting the protection) can be stored on the data storage. Note, that this information can be stored in a form of a database. Each protected object has its own timestamp. An object provides a path to the protected object from the volume's root.

Initially, a user process or a file system process 300 (such as, for example, a disk cache), issues a write file request 310 to the storage media 27. The write file request 310 is received by the file system driver 311. The write request 310 is also intercepted by the continuous backup filter 301 that checks if the object (i.e., a file or directory) is protected. If the file is protected, the write file request 310 is processed as a request to a protected object (described below).

In one embodiment, the file system driver 311 examines an area of a file, where a set of data will be written with using the storage device driver 318. In response to modification request 310, the storage device driver 318 transmits modification requests, shown as 312, to the appropriate stored data. If the set of data of the protected object was not backed up to the data storage 340 in the process of full backup of protected objects, then this set of data is backed up to the data storage 340 (the process is shown as 330).

A file can be divided into blocks (i.e., data-sets). The file is divided into blocks by a special algorithm. For example, the blocks can be 1024 KB in size. Also, blocks can be created based on a size and a type of the file. For example, a block size equals a file size/A, where A—a constant value for a particular file type or a pre-selected fixed value.

According to the exemplary embodiment, a tree of protected objects can be used instead of a list when a full backup (or a full backup of protected objects, files and directories) is created at block-level. In the exemplary embodiment, a protected object within the tree has its own attributes, such as object metadata, name of a protected object, object properties (such as size, type, etc.) and special backup attributes.

For example, one of these attributes is attribute Full (1288 in FIG. 11), which indicates that the protected object has been backed up last time during the full backup. This attribute can contain references pointing to a location of the protected object inside the backup. Another backup attribute is attribute Cdata (1290 in FIG. 11), which indicates that the protected object has been backed up during continuous data protection procedure. This attribute (same as attribute Full) can contain references to the locations of the backed up data-sets inside the backup.

Figure 11:
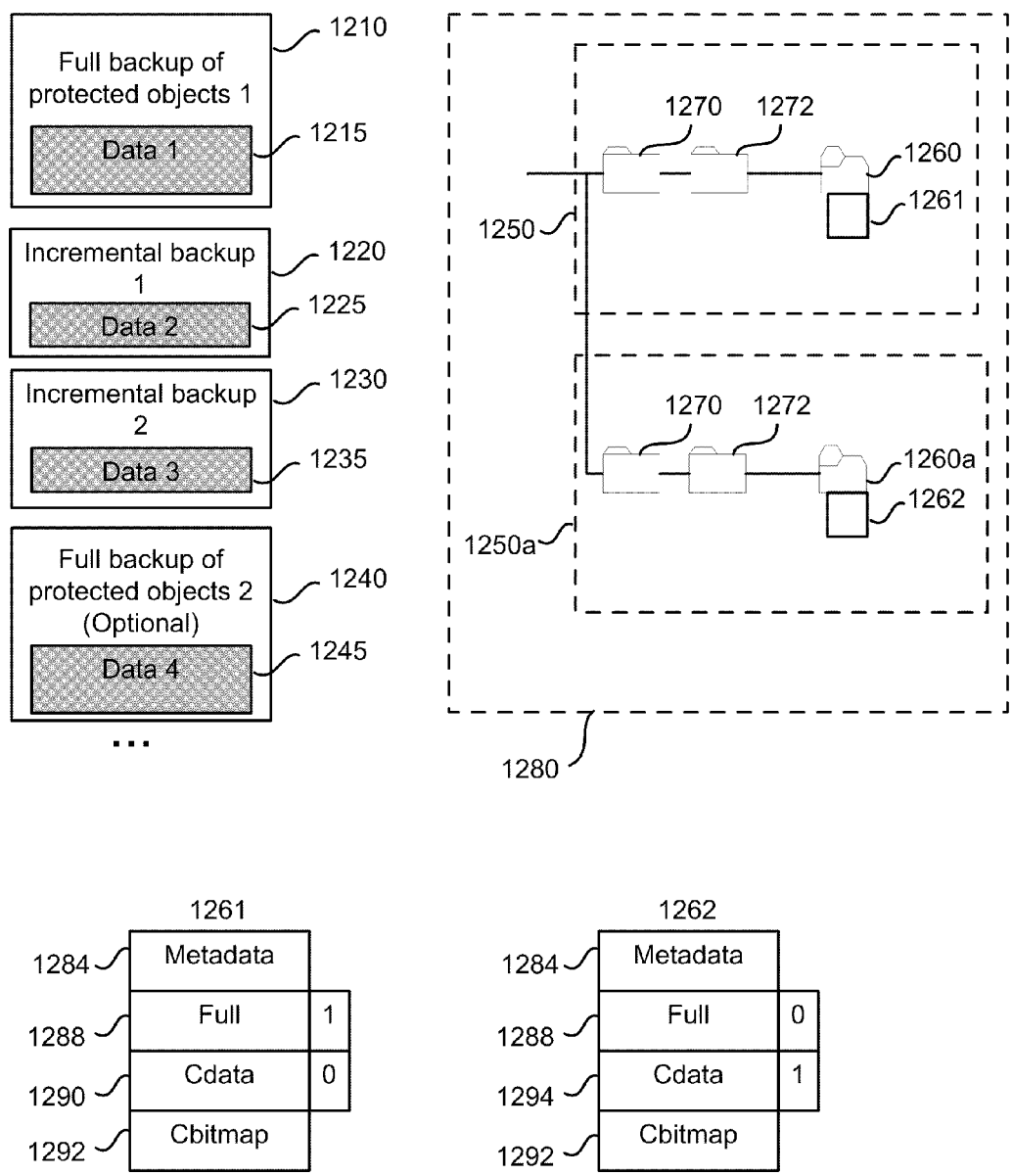
FIG. 11 illustrates and example of backups (full and incremental), as well as a directory tree.

Yet another attribute is cbitmap (1292 in FIG. 11), indicating the parts of the file (i.e., data-sets) that have been modified and backed up in the incremental backup. A full backup is a backup of all of the protected objects at a block-level or a backup of all of the data on a storage media. Note that the full backup of all of the protected objects as well as all subsequent incremental backups can be encapsulated into one or several files. Organization of the backups is also illustrated in FIG. 11.

Another backup attribute is Cbitmap, which is created during an incremental backup and contains bits reflecting file data-sets that have been modified and backed up. The Cbitmap attribute can also contain references to the locations of the backed up data-sets in the latest backup.

In one embodiment, a database can be used instead of a tree of the protected objects. This database contains all backup attributes, metadata and some service data required for backup and for continuous data protection process as well as data required for restoration data from the backup.

FIGS. 4A-4E illustrate examples of continuous data backup, in accordance with the exemplary embodiment. When a file 320 located on the storage medium 27 (see FIG. 4A) is opened or accessed by a user, a request for re-writing over some parts of the file or a request to rewrite the entire file can be received. Thus, some of the file data-sets can be overwritten. In this example, a write request 310 is received for writing into the file 320 a data-set 410 in place of a data-set 411.

At this time, a first pass-through snapshot 472 can be created. The pass-through snapshot 472 can contain a bitmap of the object's data-sets. Note that the bitmap can contain a list (or a set) of file data-sets that have been changed. The bitmap can also contain a set of new data-sets that have been added to blocks (or sectors) of a storage media that are already used by the file. Thus the bitmap has one bit representing each data set, where the data set is a portion of a file that may correspond to a block, cluster, several clusters, sector, several data sectors, part of file (if it was divided in the several data-sets) etc.

Note that a size of the data-sets can change. When a file receives a request for writing a data portion (for example, 2 bites in size), a bitmap reflecting changes of this 2 bites data-set is created in the snapshot. In case of a number of modified datasets of a small size located in the protected object among other unchanged data-sets, all data sets (modified and unchanged) can be combined into one large data-set. This also requires changing a bit in the bitmap in order to reflect offset and length of the combined data-set inside the protected object (e.g., file).

Thus, a record in the bitmap will have a following exemplary format: 0234FE (offset—distance from the beginning of the file), 600 (length of the data-set, for example, in bites) and one control bit indicating that the data-set has been modified. Alternatively, a size of the data-set can be written as a combination of two offset values.

The pass-through snapshot 472 can be created before a write file request is received. For example, the pass-through snapshot 472 can be generated simultaneously with a list of protected (unprotected) objects. The pass-through snapshot 472 can be created and stored in an operational memory of a computer system, in a storage media, on data storage or somewhere outside the system.

The pass-through snapshot 472 can also be a full backup of a file. When some data-sets of an object are changed, the data-sets stored in the snapshot can be replaced by corresponding relevant data-sets. When the file data-sets are copied from the storage media based on an active snapshot, all data-sets contained in the active snapshot can be copied. Alternatively, only the data-sets that have been changed by some given moment (i.e., creation of a new system state) are copied.

Note that a backup of at least one active snapshot is an incremental backup of initially created backup of all protected objects (see block 1605b in FIG. 6) or of a previous incremental backup. The incremental backup can have a time stamp (or an identifier reflecting a time of creation of this incremental backup) that can be used for viewing previous states of backed up protected objects belonging to the incremental (or a full) backup.

A data-set 411 is a part of a file 320 located on storage media. The data-set 411 can be overwritten by a data-set 410. At this point, the control bit reflecting changes in the protected object's data-sets (FIG. 4B) is reset in the bitmap 474 of the pass-through snapshot 424. Subsequently, an active snapshot, reflecting a latest state of the storage media, is created based on the bitmap 474 and a backup can be created using the active snapshot.

Note that, instead of the pass-through snapshots 472-475, a list of protected objects (and corresponding protected data-sets) can be used. The list also reflects the data-sets changed during data protection process.

FIGS. 4C-4E reflect a situation before creation of the active snapshot from the pass-through snapshot 474, i.e. a file (as an exemplary object) remains open by a user or a flag allowing for copying the pass-through snapshot 474 into the active snapshot has not been set. The flag can be set, for example, after a pre-set time period (for example, every five minutes) or when a particular operation (or a set of operations) is performed by a system. Setting of the flag means that the active snapshot is created based on the pass-through snapshot 474. This process is described below in more detail.

In this case, the bitmap 474 is checked for a control bit reflecting a change of a data-set. If the control bit has a value indicating that the data-set has been changed, the data-set 440 can be written in place of a data-set 413 (FIGS. 4B-4C). If the data-set has not been changed, a regular write to file operation is performed on the file on the data storage. The control bit value is reset in the bitmap 475 to reflect changes in the data-set 440 (FIGS. 4D-4E).

Figure 5A:
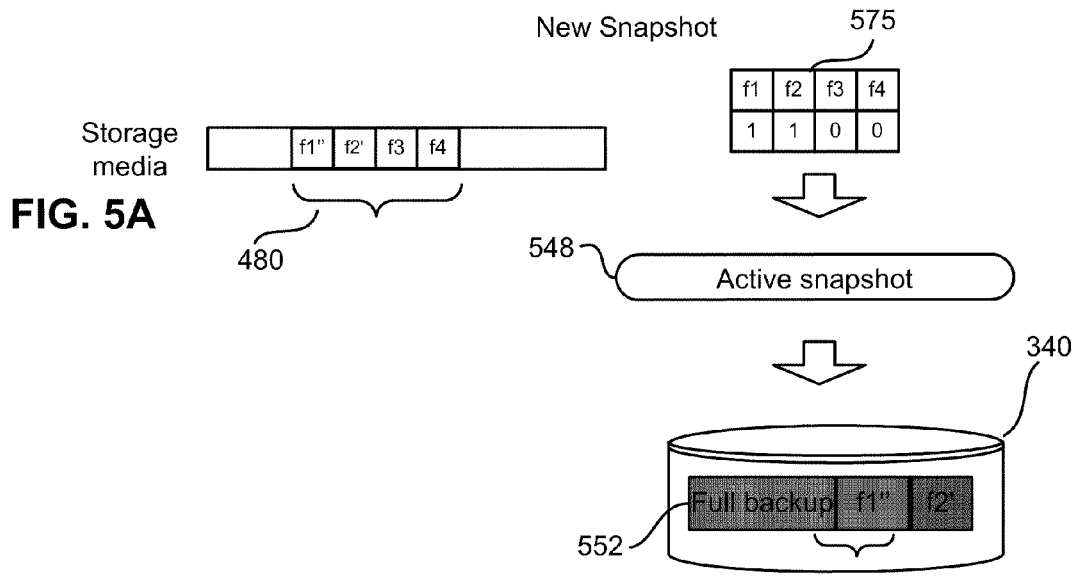
FIGS. 5A-5C illustrate examples of continuous data backup using snapshots, in accordance with the exemplary embodiment.
Figure 5B:
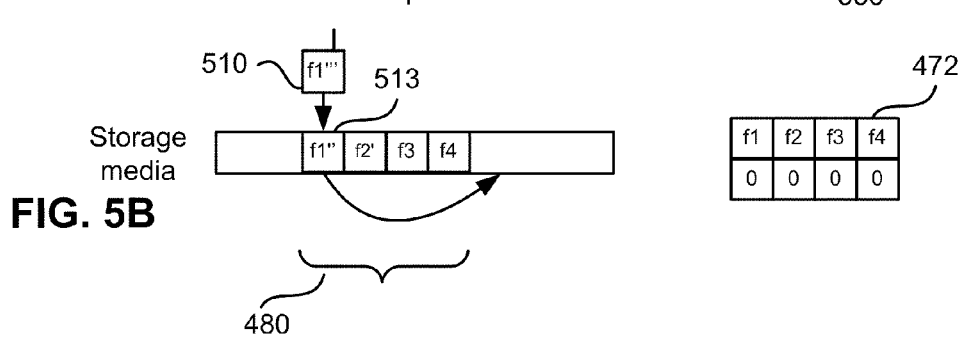
Figure 5C:
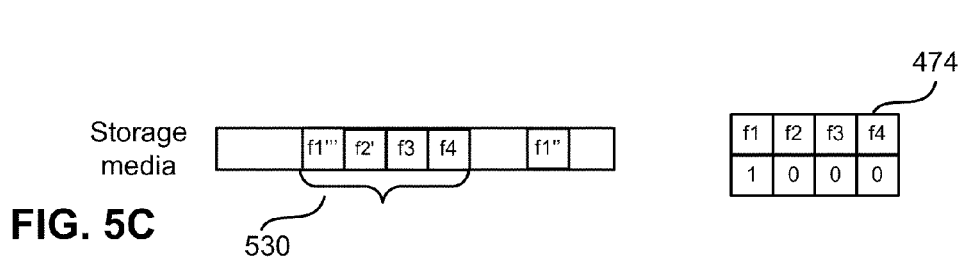

FIGS. 5A-5C illustrate examples of continuous data backup using snapshots, in accordance with the exemplary embodiment. At the time (or after) of closing/saving an opened file 480 (or after the flag is set), the active snapshot 548 (FIG. 5A) for this file is created based on the pass-through snapshot 575. An active snapshot 548 can be an exact copy of the pass-through snapshot or it can contain data-sets marked in the bitmap (see FIG. 5A). Also, a snapshot containing only references to the blocks stored on disk can be used.

After the active snapshot 548 is created, the pass-through snapshot 575 can be deleted. Alternatively, it can remain as an active pass-through snapshot where control bits reflecting changes are marked. This pass-through snapshot can be used for creation of another active snapshot reflecting changes over a longer time period as compared to the first active snapshot.

Thus, the pass-through snapshot 575 can be used until, for example, the active snapshot is transformed into a backup. In some cases, the active snapshot is a backup by default. In one embodiment, the pass-through snapshot 575 is not deleted and continues to be changed reflecting changes of the file on the storage media.

Figure 6:
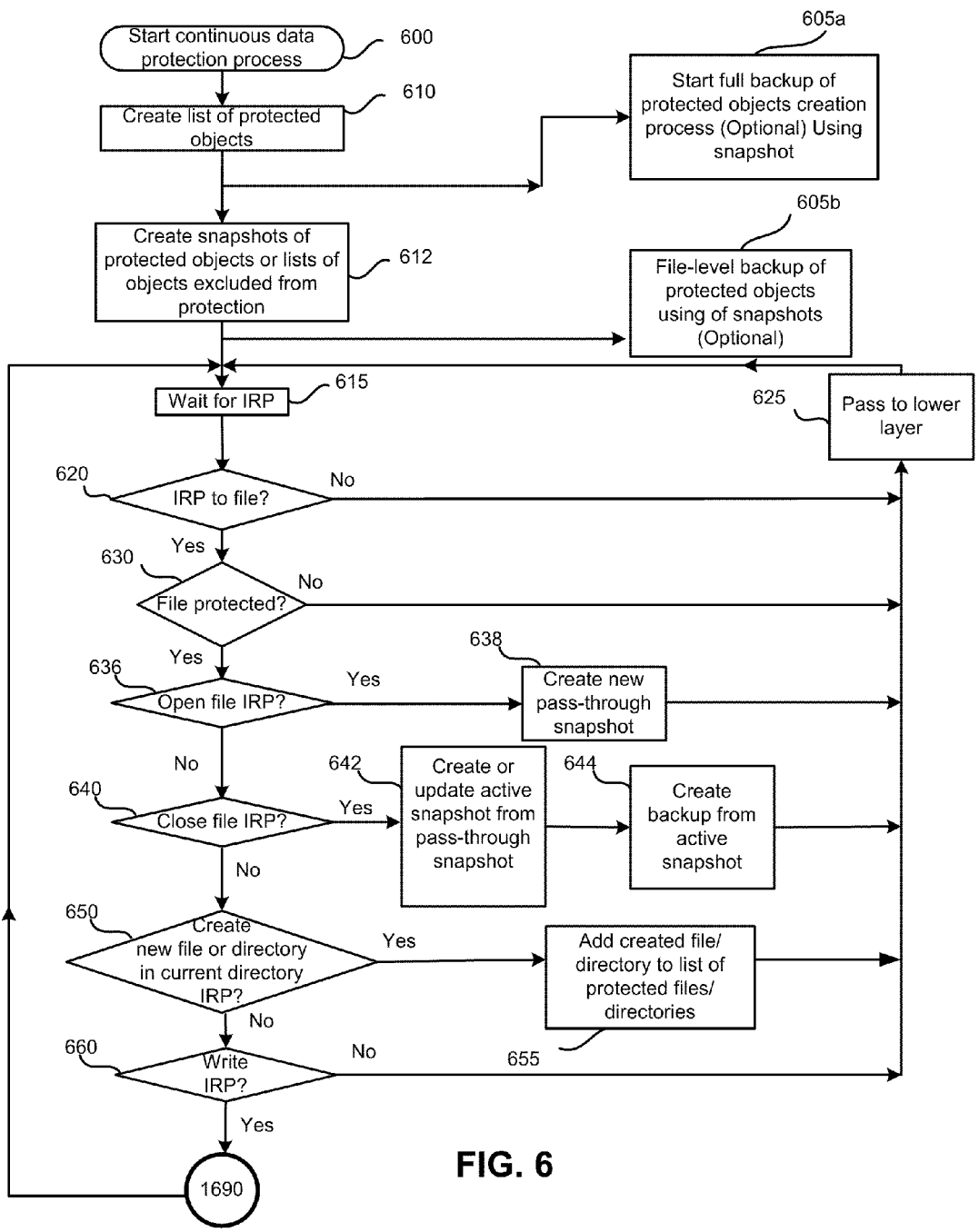
FIG. 6 illustrates a flow chart of a continuous data backup process, in accordance with the exemplary embodiment.

After the active snapshot 548 is created, an incremental backup 556 of a full or a partial backup 552 is created (see step 1605b or step 1605a in FIG. 6). A number of active and pass-through snapshots for a file are not limited. The backups can differ by the time stamps and by the data-sets contained in them. The snapshots for individual files can be combined into an aggregate snapshot.

FIG. 5B illustrates a situation when another write request is received (i.e., the file is open again, for example, for editing, by a user). However, the data from the active snapshot has not been backed up yet. In this case, the data-set 513 located in place where the write request is intended to be executed can be copied into a free space on the same volume, storage media or operational memory of a computer system. Then, a reference to the data-set 513 in the active snapshot 850 is changed to a new location of the data-set 513.

After that (or in parallel with this process) the data-set 510 is written in place of the data-set 513 and a block is marked in the snapshot bitmap, as discussed above. A result of these operations is reflected in FIG. 5C.

FIG. 6 illustrates a flow chart of a continuous data backup process, in accordance with the exemplary embodiment. The continuous data protection procedure begins at step 600. After the start of continuous data protection procedure, the list (or a table) of all of the protected objects is created in step 610. Note a process of the full block-level or file-level initial backup 605a of protected objects of a storage media. The protected objects can be files and/or directories. The list of protected objects can duplicate the part of the file system tree containing a protected object. For example, the user decides to protect \Folder1\Folder2. Folder1 contains File11 and File12. Folder2 contains File21 and File22.

If this is the case, the following folders inside the tree storage are created: \Storage\Tree\D.Folder1, \Storage\Tree\D.Folder1\D.Folder2, and the following files: Storage\Tree\D.Folder1\D.Folder2\F.File21, Storage\Tree\D.Folder1\D.Folder2\F.File22. These object's creation occurs right after the user has decided to protect \Folder1\Folder2.

Note that there are no files created inside the tree storage for \Folder1\File11 and \Folder1\File12 because \Folder1 is not defined to be a protected one. Special prefixes in object names (D. for folder and F.—for file) can be used to avoid the problems when user decides to protect folder Folder having a sub-folder Object and moves out folder Object and then creates a file Object.

Note that in step 610 the process of protecting objects can be started instead of a full backup of the storage media. Also note, the backup of protected object(s) to data storage can be created if the WRITE IRP (an interrupt request packet) is passed to this protected object. In step 612 pass-through snapshots are created for protected objects (i.e., for each file or a set of files a separate snapshot is generated).

After the pass-through snapshot is created for a protected object, this object can be backed up in step 605*b*. This can be done instead of step 605*a* in order to avoid a full backup of the storage media and to backup all protected objects. Note that the backup of all protected objects in step 605*b* can be executed at a block-level. Also, the protected objects can be backed up into one or several backups. Backup of a protected object can be started after receiving an IRP.

In step 615, the continuous data protection process waits for the IRP. Note that the IRP, in general, is a request to the OS kernel to perform some action relating to the files/directories, such as a write or a read operations performed on the file.

Once the IRP is received, the IRP is analyzed. If the IRP is not pointed to the file or directory (step 620), then this IPR is passed to a lower layer (step 625). If in step 620, the IRP is pointed to a file/directory, then the process goes to step 630, where the IRP is analyzed, and if it is not pointed to the protected file/directory (if any of them are present in list of protected objects), then this IPR is passed to a lower layer (step 625). If IRP is pointed to the protected file/directory, then in step 640 is checked if it is a Close file IRP.

Note that a Close file IRP, for purposes of this discussion, means that a user has completed his actions with a file that he opened. According to the exemplary embodiment, a user can stop working with an open file at any time. It can be done automatically by setting a data security application so that an open file on the data storage 340 is closed upon invocation of a particular event (such as, for example, an interruption, switching between open files, an expiration of the pre-set time-out, an attempt by a user to save the file or an automatic attempt by a system or an application to save the file, etc.).

If in step 640 the IRP is a Close file IRP, an active snapshot for this file is created based on the pass-through snapshot in step 642. This snapshot is used for creation of a full backup in step 644 (unless the active snapshot is a backup). If in step 640 the IRP is not a Close file IRP, then the process goes to step 650, wherein is checked if new file or directory created in current protected directory.

If a new file or a directory is created in a current protected directory, then this object is included, in step 655, into a list of protected objects, such as, for example, \Storage\Tree\D.Folder1\D.Folder2 for Folder2 created in Folder1 on the Storage (for example, storage media 27), and the Storage\Tree\D.Folder1\D.Folder2\F.File21 for File21 created in the Folder2, which is located in the Folder1 on the Storage (for example, storage media 27). Then, the process goes to step 625.

If in step 650 a new file or a directory is not created in a current protected directory, then the process goes to step 660, where it is checked if the IRP is not a Write to file IRP. If the IRP is not a write to file IRP, then the process proceeds to step 1625, otherwise the process goes to step 690, and, then, the process goes back to step 615.

Figure 7:
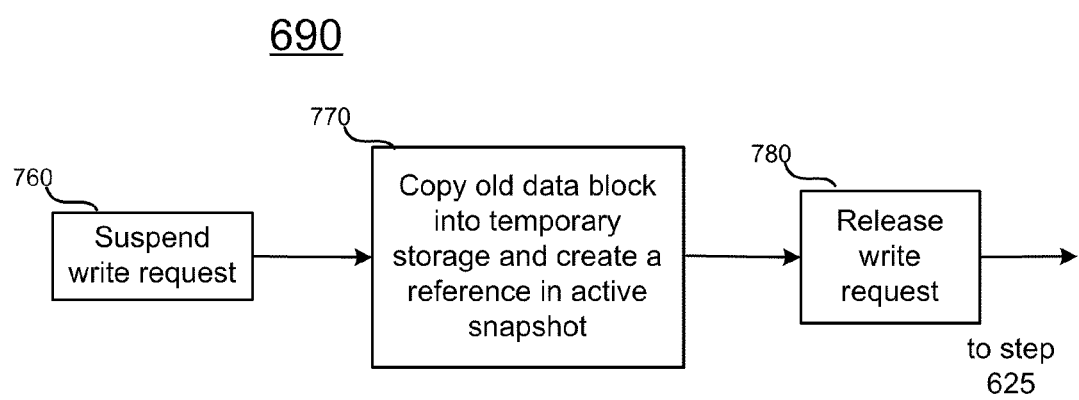
FIG. 7 illustrate parts of the flow chart depicted in FIG. 6.

FIG. 7 illustrates step 690 of a flowchart shown in FIG. 6 that takes place after step 660. Step 690 reflects the scenario shown in FIGS. 5B-5C. If the IRP is a write IRP, then at step 760 a write request is suspended. Then, in step 770, a data-set is copied into a temporary storage 940 (FIG. 9) and a reference to this data-set is changed in the active snapshot subsequently, the write request is released in step 780.

Figure 8A:
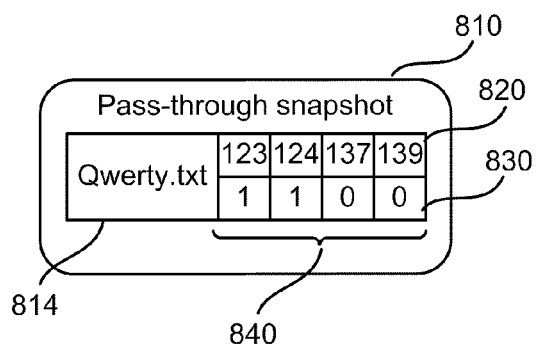
FIGS. 8A-8C illustrate examples of active and pass-through snapshots used for data backup process.
Figure 8B:
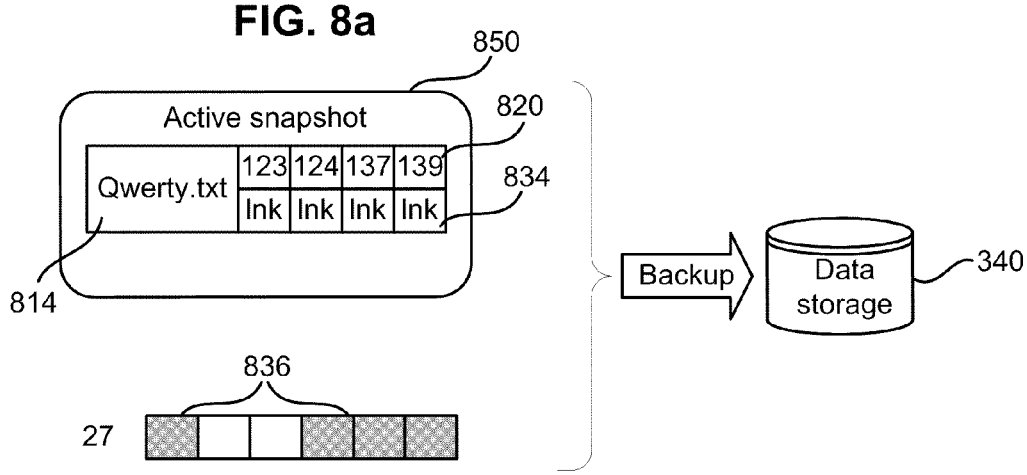
Figure 8C:
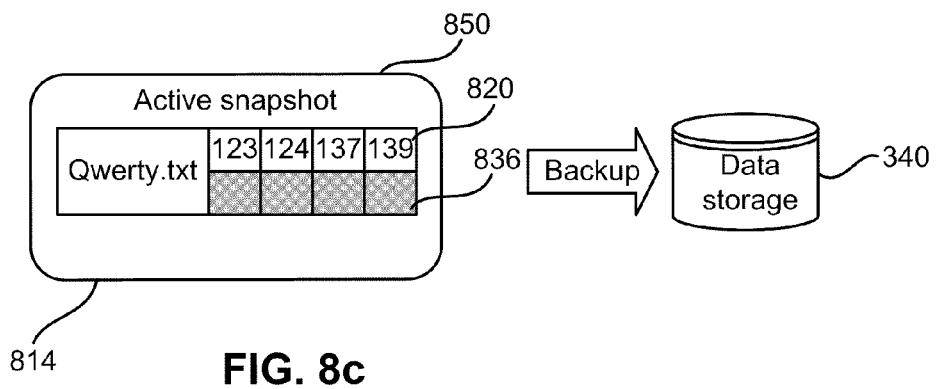

FIGS. 8A-8C illustrate examples of active and pass-through snapshots used for a data backup process. FIG. 8A illustrates a pass-through snapshot 810 that can be created at file opening or after creation of a list of protected objects. The pass-through snapshot 810 is created for the protected object and can include a name of the protected object 814. Alternatively, a special reference table reflecting connections between the protected objects and the corresponding pass-through snapshots can be created outside the snapshot.

The pass-through snapshot 810 can also include a bitmap 840 having, identifiers of a data-set 820. The identifiers can use numerical values or use any other identification data. The bitmap 840 also includes control bits 830 reflecting changes taking place in the file data-sets during a continuous data protection process. Also, the pass-through snapshot 810 can include not only the bitmap 840, but the data that has been changed during the continuous data protection process (i.e., an active snapshot 850).

FIGS. 8B-8C illustrate exemplary active snapshots 850 created in the described above situations. The active snapshot 850 can be created by copying the pass-through snapshot 810 or it can be created based on the pass-through snapshot 810 in cases when the pass-through snapshot 810 contains only the bitmap 840.

The active snapshot 850 can include a name of a protected object. The active snapshot 850 can be of several types. For example, it can contain references 834 pointing to changed data-sets 836 (FIG. 8B) located on a storage media 27. Also the active snapshot 850 can contain the changed data 836 (FIG. 8C). The active snapshot 850 can be used for creating backup of the storage media 27 on the data storage 340. Note that the backup of the data storage 27 can be created at block level or at disk volume level. In other words, the back up can be a block-level backup or a disk-level backup.

Figure 9:
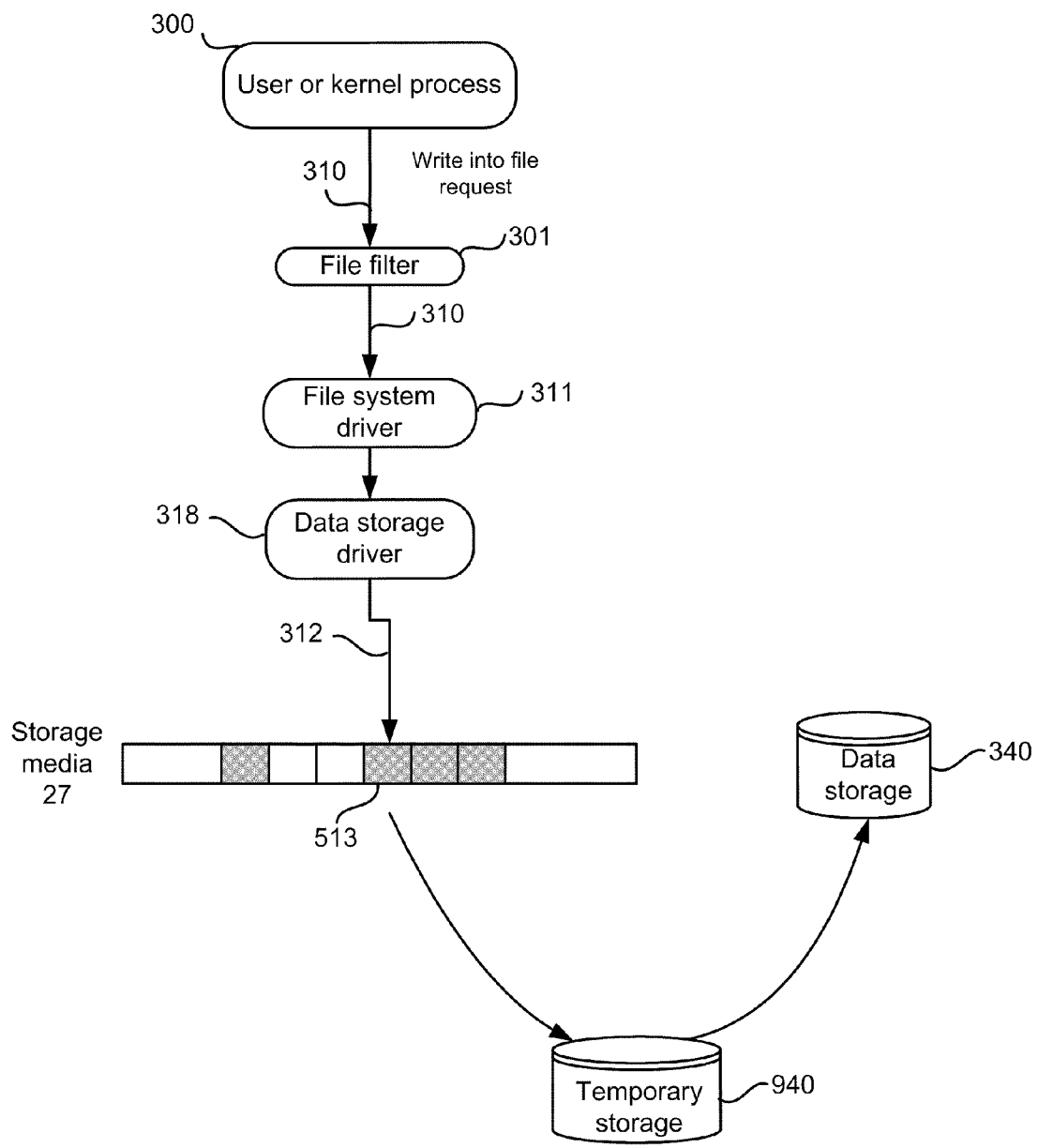
FIG. 9 illustrates a continuous data backup process using a temporary storage, in accordance with the exemplary embodiment.

FIG. 9 illustrates a continuous data backup process using a temporary storage, in accordance with the exemplary embodiment. FIG. 9 reflects a situation depicted in FIG. 5B when the data-set 513 located in space of a write operation is copied onto a temporary storage 940. It can also be copied into a free space on the same storage media, into a file on the same storage media or into a partition on a different media including operational memory of a computer system. Then, a reference to this data-set is changed in the active snapshot 850 to point to a new location of the data-set 513.

After this process (or in parallel with this process) a data-set 510 is written into the space of the data-set 513. The process of marking the data-set in the bitmap of the pass-through snapshot is executed as describe above.

During creation of the backup from the active snapshot of the protected object, the corresponding data-sets stored in the temporary storage 940 and the data-sets located on the storage media 27 are used for creation of the backup of the protected object on the data storage 340.

According to the exemplary embodiment, each backed up object can be selectively restored from the backup or all files can be restored from the backup. Also, instead of creation of a full backup in step 1605a (or additionally), a backup of loading areas and system areas of the storage media 27 can be created.

Thus, during restoration of the files to the disk, loading and system areas of the storage media 27 can be restored first. Then, all (or selected) files located in backups 552, 556 and in subsequent incremental backups are restored. Note that an incremental backup can contain modified data-sets or entire modified protected objects. The incremental backup 556 and the full backup 552 can be presented as two separate files as well as one combined file.

Figure 10:
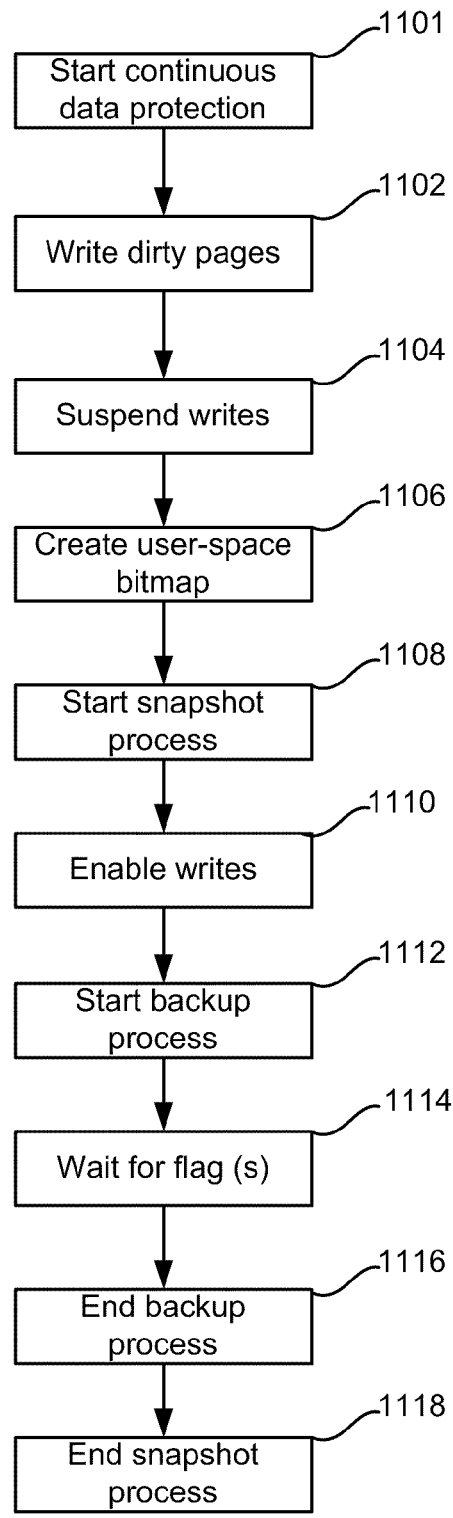
FIG. 10 illustrates a backup method, in accordance with the exemplary embodiment.

FIG. 10 illustrates a backup method in accordance with the exemplary embodiment. Continuous data protection process begins at step 1101. After the write file request is received, a data, required to be written based on the write file request, is backed up into the incremental backup. After step 1101, the "dirty pages" are written from the cache to storage (step 1102). Dirty pages are the pages in an OS cache that contain information to be written into a storage device, but that have not been written due to an OS policy or other OS mechanisms (for example, a "lazy write" approach used in some modern OSs). The next step (step 1104) suspends write operations.

These suspended write operations are added to a special list, and a parameter is returned to the operating system, informing the operating system that these write operations have a "pending" status. In other words, the operating system will know that the write command execution has been postponed until later. In step 1106, a user-space bitmap is created. Drivers of the operating system are not used to create it. Rather, the storage medium (for example, a disk drive) is read directly, the file system structure is identified, and the data blocks that are being used are identified.

It should be noted that although in the exemplary embodiment the bitmap is created on a data block level, it is possible that the bitmap creation procedure is related to file system's reflection into a block space of the storage device, and considers only non-utilized blocks (as opposed to free blocks). Thus, the data blocks that are being used are tagged with, for example, a 1 in the bitmap, and the data blocks that are not used are tagged as 0 in the bitmap.

Note that the size of the data block can be relatively large. For example, it can be larger than a typical sector in a hard disk drive. In other words, as discussed below, there may be a need for a further step that determines which part of the data block is actually being used, if the data block is relatively large. Note that the values used in the bitmap can be not only binary 0s and 1s. As another option, the bitmap can be used to store information about bad blocks. Note also that the bitmap can be created and managed in a user space, or, alternatively, in an OS kernel space.

In step 1108, the snapshot process begins. Creation of a snapshot is disclosed in the U.S. Pat. No. 7,246,211 entitled "System and method for using file system snapshots for online data backup" and in the U.S. Pat. No. 7,047,380 entitled "System and method for using file system snapshots for online data backup" incorporated by reference herein. Note that the snapshot process can run asynchronously. In other words, once the snapshot process is launched, it can proceed in a separate thread, asynchronously related to the process illustrated in FIG. 10.

In step 1110, write operations are enabled. In step 1112, the backup process is started. Note that the backup process is also an asynchronous process. Also, note that a snapshot and a backup processes can be either synchronous or (preferably) asynchronous relative to each other. Synchronization can be performed using access to the bitmap as a serialization mechanism. Once a flag, indicating that the backup process is completed, is received (in step 1814), the backup process is ended at step 1116. Then, the snapshot process also ends at step 1118.

FIG. 11 illustrates an example of backup creation (full or incremental) as well as a catalog tree discussed above. Note that the backup files 1210, 1220, 1230 and 1240 along with backed up data 1215, 1225, 1235 and 1245 can be implemented in any form. For example, as shown in FIG. 11, or as a single file or as a number of separate files.

A catalog (or directory) tree 1280, can contain a main catalog tree 1250 of protected objects (e.g., files and directories). For example, a Root directory 1270 and a directory 1272, containing the protected object 1260 (i.e., a file). Backup attributes and metadata 1261 of each protected object are located in the directory tree.

The directory tree can be implemented as an application installed on the system for backup creation and data protection. The directory can also be stored with the files for backup files). Alternatively, a database can be used instead of a directory (catalog) tree.

After creation of an incremental backup (or during its creation), a special new branch is created within the directory tree. For example, after the incremental backup 1220 is created for a file listed in the directory tree as 1260, an additional branch 1250a is created for the directory tree. The additional tree branch 1250a contains the information reflecting that this file has been modified and the modified data 1225 has been backed up into the incremental backup 1220. The additional branch also contains a path to the files (1270, 1272, 1260a). The attributes and metadata 1262 of the backup can be modified as well.

Note that in addition to the incremental backups 1220 and 1230, a full backup of all protected objects can be created upon each system launch. The full backup includes creation of a new tree of protected objects and modification of metadta and attributes of the backup. For example, a bit can be dropped in attribute Cdata 1294 and a bit can be written into the attribute Full 1288. Also, an incremental backup can be created for all of the protected objects. The incremental backup involves modification of directory tree and modification of metadata and attributes of the protected objects.

Figure 12:
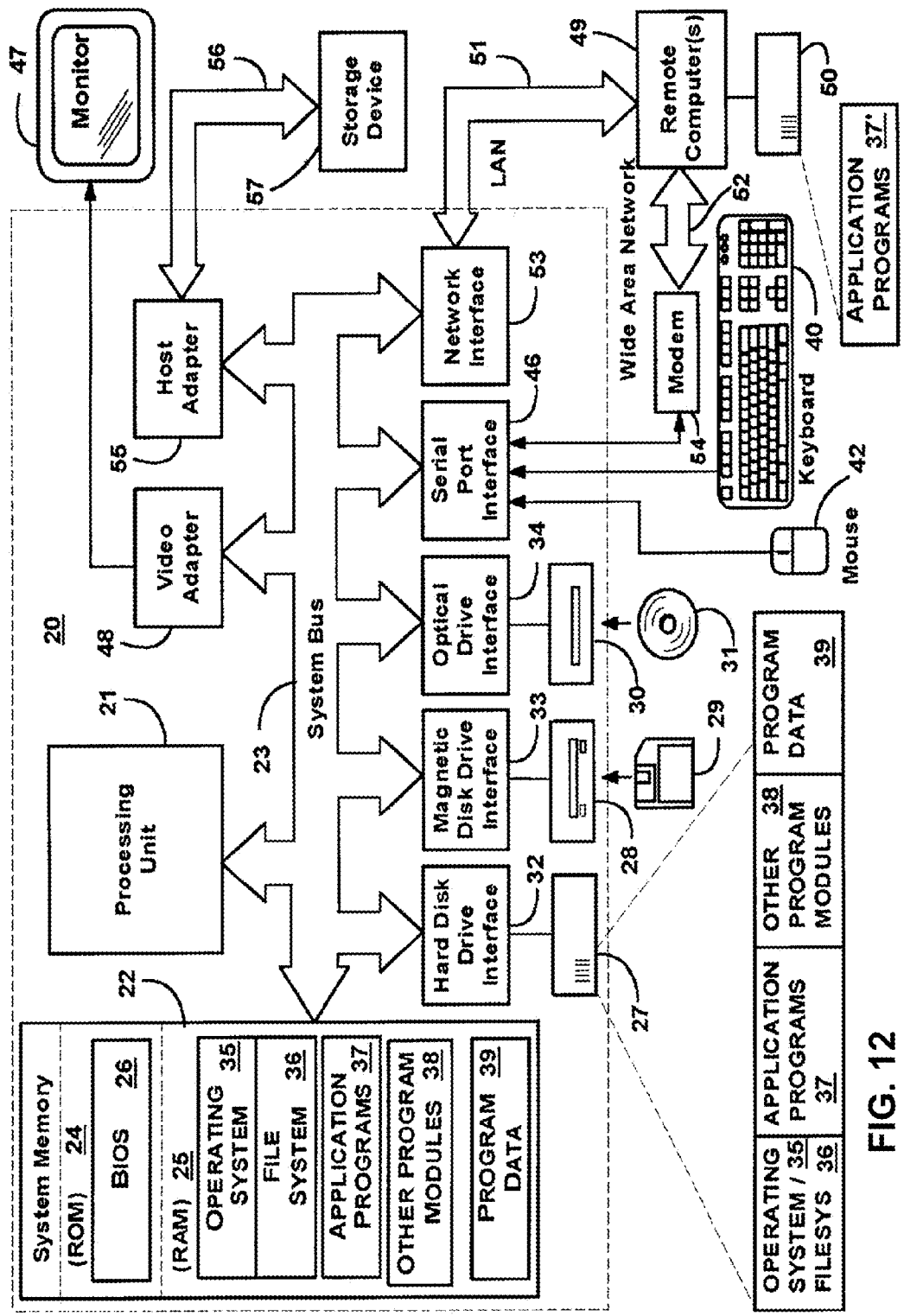
FIG. 12 illustrates an exemplary computer system, on which the exemplary embodiments can be implemented.

With reference to FIG. 12, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for continuous data protection on a computer system, the method comprising:
    creating a list of protected data objects and a list of objects excluded from protection, the protected data objects having a plurality of data-sets, the data objects being files or folders;
    creating a full file-level backup of the protected data objects;
    generating intermediate pass-through snapshots for the protected data objects during a write attempt into an open protected data object, wherein the pass-through snapshot includes identifiers of the data-sets and a bitmap reflecting changes in the data-sets of the protected data objects;
    creating active snapshots based on the pass-through snapshots, the active snapshots reflecting latest states of the protected objects; and
    creating incremental backups from the active snapshots, wherein each pass-through snapshot has a plurality of control bits assigned to each of the data-sets in the bitmap and wherein the control bits indicate that the data-set has been changed during a continuous data protection period that begins when a write file request is received.

2. The method of claim 1, wherein states of the backed data are viewable at a point of creation of the active snapshot used for creation of the backup.

3. The method of claim 1, wherein the list of protected data objects is generated based on a list of objects excluded from protection.

4. The method of claim 1, wherein the backed up data objects are restored from the backup individually.

5. The method of claim 1, wherein the backed up data objects are restored from the backup as a group.

6. The method of claim 1, wherein all backed up objects are restored after a restoration of the full backup.

7. The method of claim 1, wherein all backed up objects are restored after a restoration of system and loading areas of a storage media.

8. The method of claim 1, wherein the full backup is created at a file-level.

9. The method of claim 1, wherein the full backup is created at a block-level.

10. The method of claim 1, wherein the pass-through snapshot comprises a bitmap of data-sets corresponding to at least one protected object.

11. The method of claim 1, wherein the pass-through snapshot comprises data-sets of at least one protected object.

12. The method of claim 1, wherein the pass-through snapshot comprises a name of at least one protected object.

13. The method of claim 1, wherein the active snapshot comprises data-sets of at least one protected object.

14. The method of claim 1, wherein the active snapshot is a copy of the pass-through snapshot.

15. The method of claim 1, wherein the pass-through snapshot is generated when a protected object is opened.

16. The method of claim 1, wherein the active snapshot is generated when a protected object is closed.

17. The method of claim 1, wherein the active snapshot is generated periodically for open files.

18. The method of claim 1, wherein the full file-level backup of the protected data objects is created after the computer system is started.

19. The method of claim 1, wherein the full file-level backup of the protected data objects is created prior to shutdown of the computer system.

20. A system for continuous data protection, the system comprising:
- a file system that stores data objects comprising data-sets on a storage media, the data objects being files or folders;
- a file system driver that services the file system;
- a storage media for storing the file system data, the storage media connected to the file system driver; and
- a file system filter that monitors changes in the file system having a set of protected data objects that are being monitored, wherein the file system filter redirects, to backup storage, the data-sets of data objects modified prior to the modification, and overwrites the portions with new data, and wherein:

intermediate pass-through snapshots are created for all protected data objects during a write attempt into an open protected data object, each pass-through snapshot includes identifiers of the data-sets and a bitmap having a plurality of control bits assigned to each of the data-sets, wherein the control bits indicate that the data-set has been changed during continuous data protection period that begins when a write file request is received by the file system filter;

active snapshots, reflecting latest states of the data objects, are created based on the pass-through snapshots; and incremental backups are created from the active snapshots.

* * * * *